Sept. 9, 1924.
R. A. DAVENPORT
AIRCRAFT
Filed June 5, 1922 4 Sheets-Sheet 1
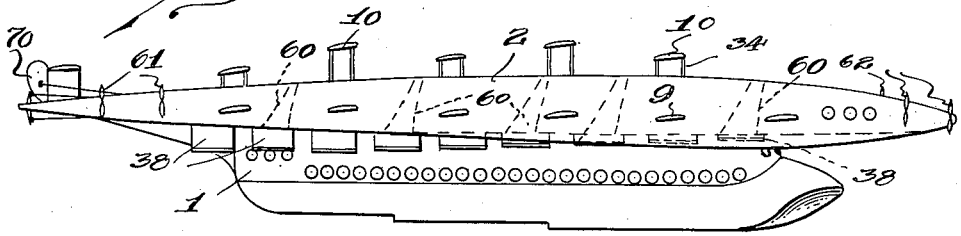
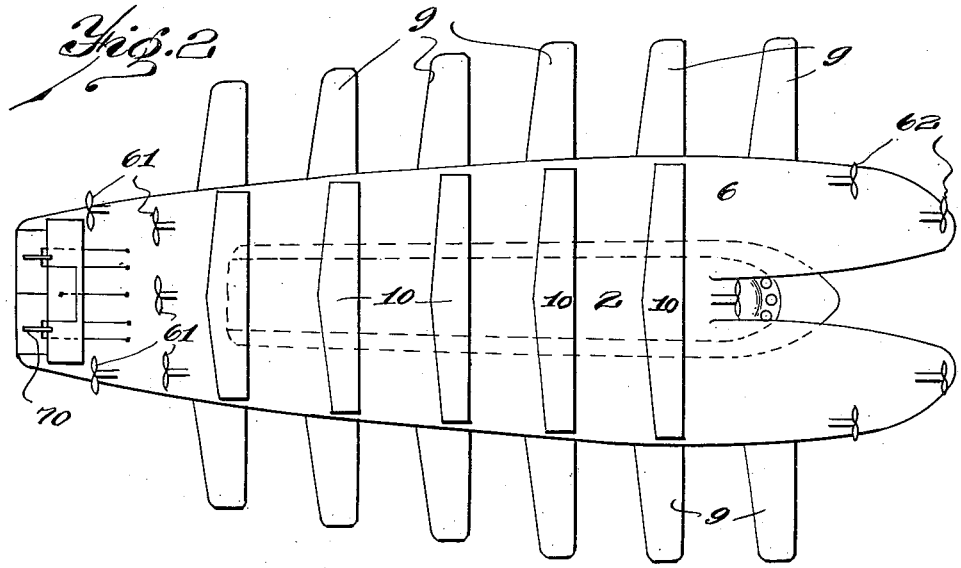
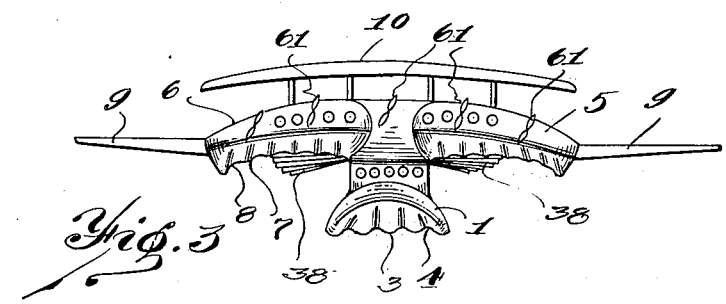
Inventor
Richard A. Davenport.
By J. King Harness
Attorney

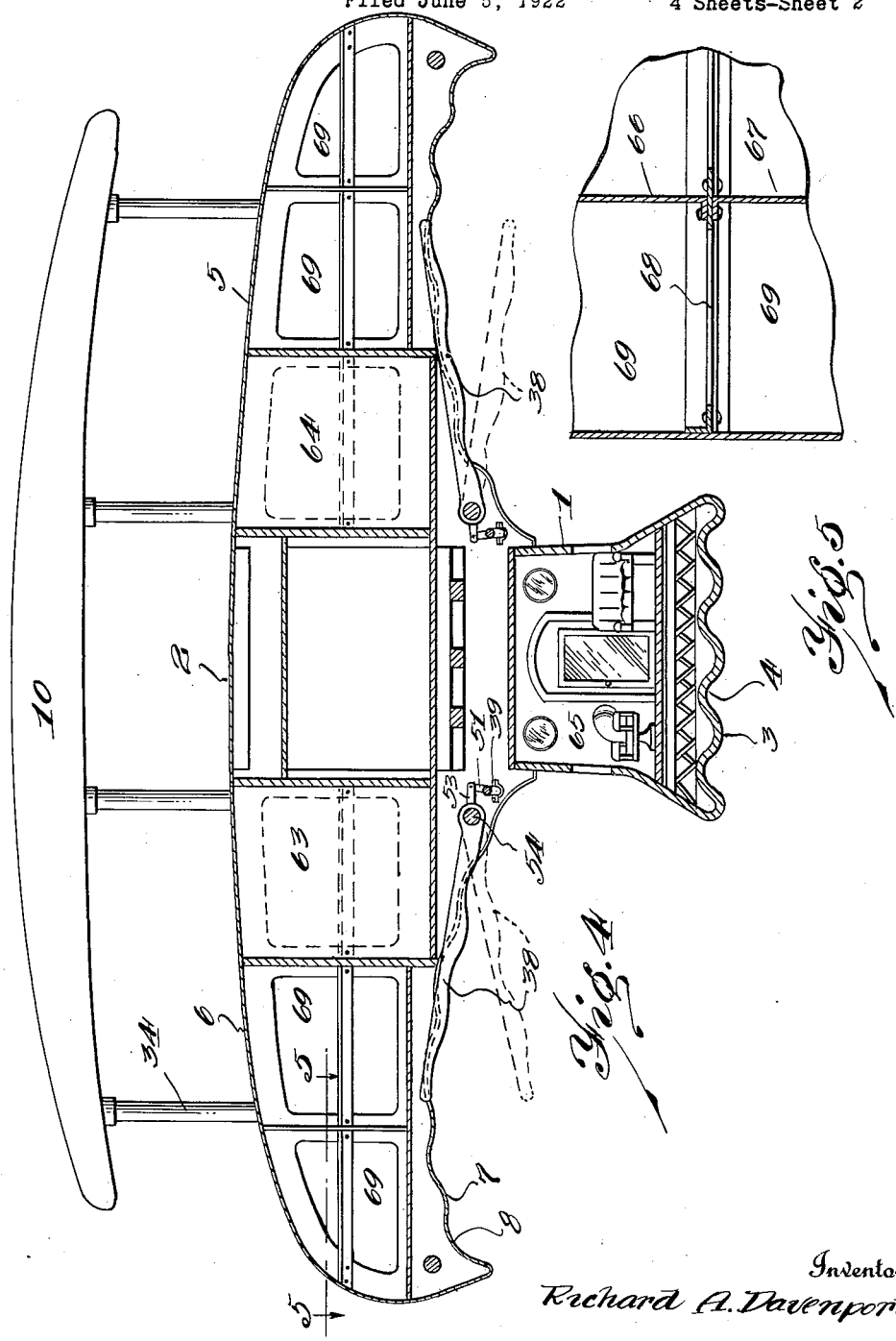

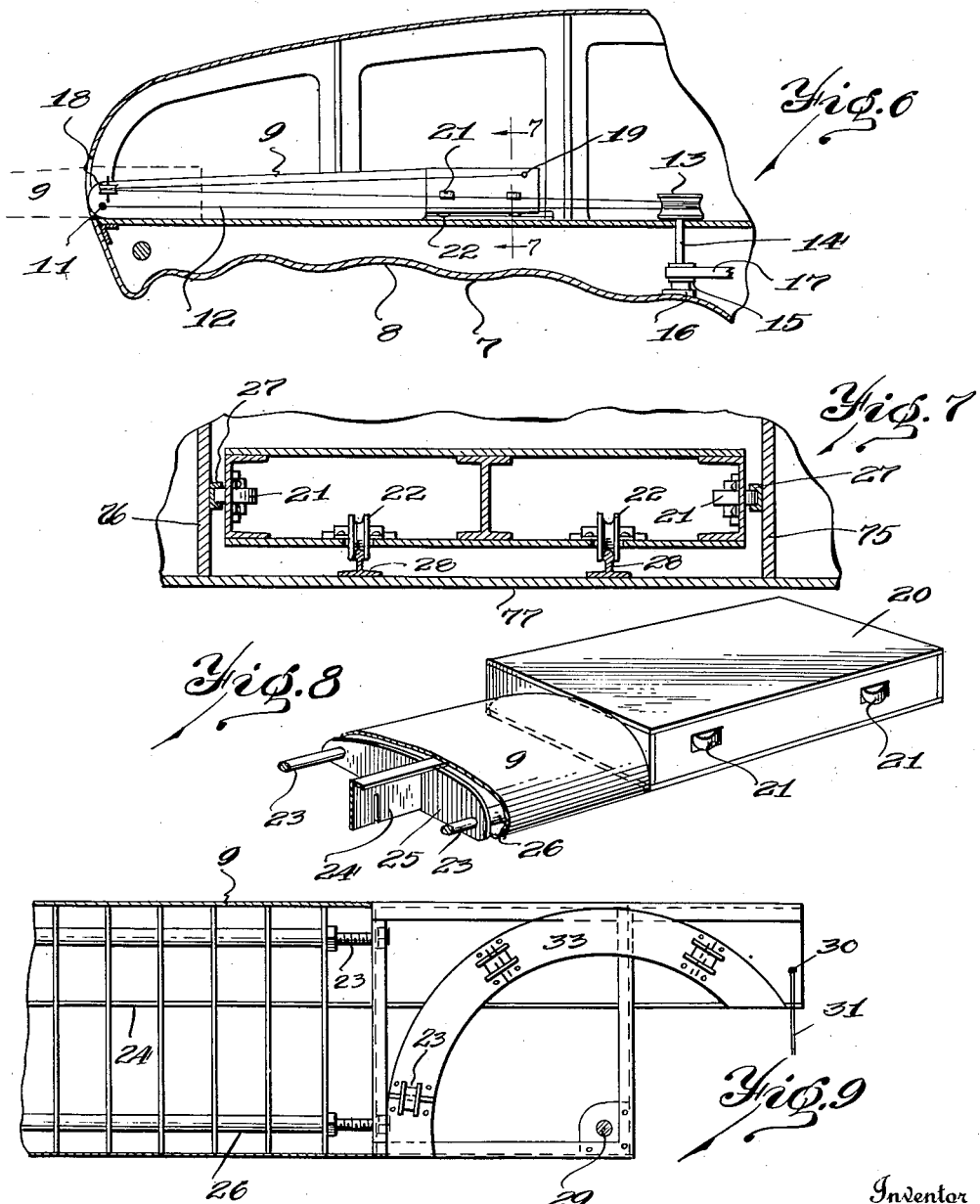

Sept. 9, 1924.   R. A. DAVENPORT   1,507,588
AIRCRAFT
Filed June 5, 1922    4 Sheets-Sheet 4
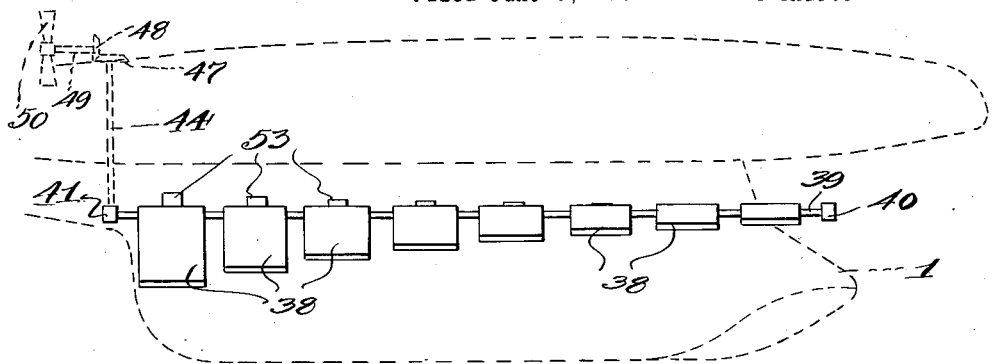
Fig. 10
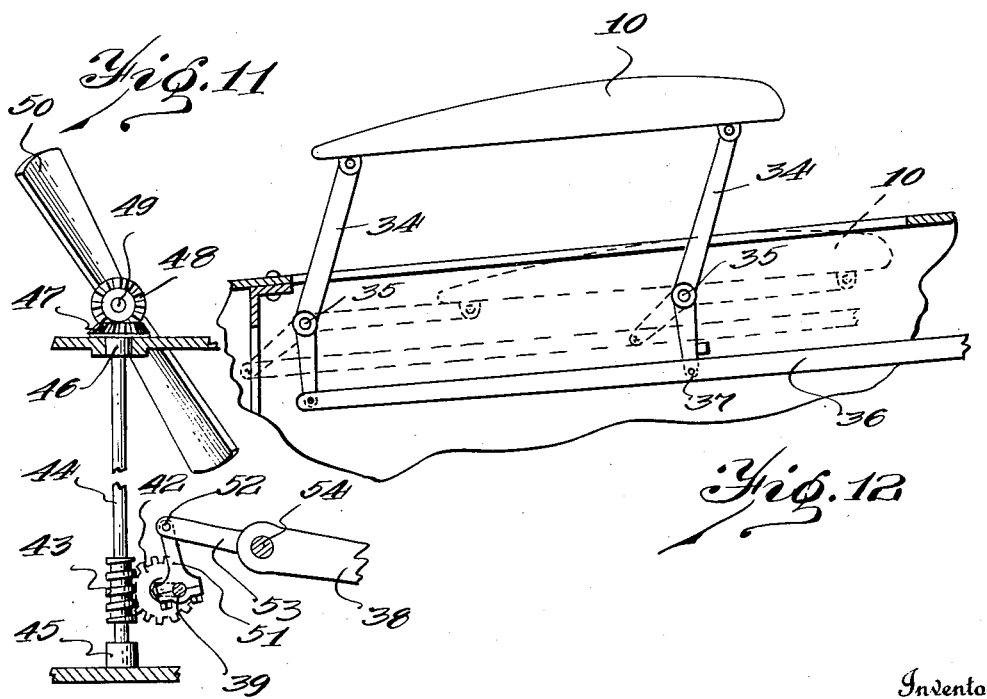
Fig. 11
Fig. 12
Inventor
Richard A. Davenport
By *Jing Harness*
Attorney Patented Sept. 9, 1924.

1,507,588

UNITED STATES PATENT OFFICE.

RICHARD A. DAVENPORT, OF DETROIT, MICHIGAN.

AIRCRAFT.

Application filed June 5, 1922. Serial No. 565,881.

*To all whom it may concern:*

Be it known that I, RICHARD A. DAVENPORT, a citizen of the United States, residing at Detroit, in the county of Wayne and State of Michigan, have invented certain new and useful Improvements in Aircraft, of which the following is a specification, reference being had to the accompanying drawings.

It is the primary object of my invention to provide an aircraft so constructed as to render impossible the upsetting thereof and maintain stability under all conditions in flight when in the air and that may be operated with the same degree of safety and convenience as other means of transportation which are in common use.

With these objects in view, it is my purpose to so construct an aircraft as to render impossible side slippage or turning of the craft to such a degree as to cause it to lose its balance—"turn turtle"—or to dangerously tip in a sidewise direction. It is also my object to so construct the craft that it may not tail spin or nose dive, in fact, to maintain perfect stability under all conditions of flight. At the same time, it will be possible to successfully steer the course of the craft in any direction as is desired or necessary for its guidance.

It is a further object of my invention to construct such a craft wherein the minimum resistance to the air will be had when the same is in flight and wherein the maximum amount of lifting power may be utilized.

It is my object further to provide a craft having a number of movable wings which may be utilized for the purpose of attaining a desired flying height and which may be disposed out of use and out of contact with the air after the desired height for flying is reached so that the minimum resistance to the air is had.

It is a further object of my invention to provide means for controlling air currents and to direct air pressure and vacuum to the utmost advantage for flying purposes.

It is a still further object of my invention to provide such a craft adapted to rise from or to alight on water so that a large land space will not be necessary in taking off or alighting and wherein the bottom of the fuselage is so constructed as to both assist in the direction of air currents when in flight and to reduce the impact when the air craft alights on water.

It is a still further object of my invention to provide a series of oscillating wings adapted to present a helical form with respect to each other longitudinally of the craft and means for operating said wings in an alternate manner so as to assist in the maintenance of stability and aid in the propulsion of the craft.

With these and other objects in view, my invention consists generally in the arrangement, combination and construction of the various parts of my improved craft as described in the specification, claimed in my claims and shown in the accompanying drawings, in which:

Fig. 1 is a side elevation of my improved craft.

Fig. 2 is a plan view thereof.

Figure 3 is a front elevation thereof.

Fig. 4 is a central sectional view thereof.

Fig. 5 is a sectional view taken on line 5—5. of Fig. 4.

Fig. 6 is a sectional view showing means for operating one of the movable wings employed on the side of the body portion of my improved craft.

Fig. 7 is a view taken on line 7—7 of Fig 6.

Fig. 8 is a perspective view showing part of a telescopic wing such as is shown in Figs. 6 and 7.

Fig. 9 is a detailed view of a jack-knife wing such as may be used on the side of the body of my improved craft.

Fig. 10 is a view showing a number of oscillating wings disposed beneath the body of my improved craft and means for operating the same.

Fig. 11 is a detailed view of the operating means disclosed in Fig. 10.

Fig. 12 is a view showing means for operating a wing disposed on the top of the body of my improved craft.

My improved craft is provided primarily with a fuselage 1 and a body portion 2 mounted directly above the fuselage 1.

The bottom of the fuselage 1 is provided with a series of ridges 3 and valleys 4, the purpose of which is to assist in the direction of air currents when the craft is in flight and to reduce the impact of the fuselage on the water when the craft alights and reduce adhesion to surface of water when the craft is "taking off."

The body 2 has sides 5 and 6 which project on either side of the fuselage 1 which sides are provided with ridges 7 and valleys 8, similar to ridges 3 and valleys 4 on the fuselage to assist in the direction of air currents when the craft is in flight. The sides 5 and 6 are curved on the bottoms and tops thereof as is more particularly shown in Fig. 3 so that the tops thereof will present the least possible resistance to air when the craft is in flight and so that a volume of air will be held on the bottoms thereof and directed along the longitudinal course of the craft rendering substantially impossible the passage of the air currents in a lateral direction so that when the craft is conducted into the air, it is substantially impossible for it to side slip or laterally tilt in such a manner as to allow the craft to over turn.

For the purpose of assisting the craft in reaching its desired altitude, I have provided a series of lateral wings 9 extending outwardly from the sides 5 and 6 and a series of wings 10 disposed directly above the body 2 and partially over the sides 5 and 6 thereof.

The wings 9 are adapted, once the craft has attained its desired altitude, to be housed within the sides 5 and 6 so as to be free from contact with the air and out of use. The wings may be of the telescopic type or of the jack-knife type, or both, as desired. When it is desired to operate the wings of the telescopic type, I provide a cable 12 attached at one end as at 11 to the side of the body and leading to a roller 13 provided on the end of a shaft 14 which shaft 14 is provided with a roller 15 on its other end and journalled on the bottom of the sides 5 and 6 as at 16. A belt 17, which may be operated by any suitable source of supply such as a motor or by hand, will cause rotation of the roller 15 and the shaft 14 and correspondingly the roller 13. The cable 12 is wound around the roller 13 several times and passes on around a roller 18 suitably disposed in the sides 5 or 6 and thence to a point 19 on the rearward end of the wing 9. The wing 9 is provided with a rectangular end 20 having rollers 21 and 22 therein adapted to rotate on the tracks 27 and 28 provided on the brace members 75, 76 and 77; thus, when the cable 12 is operated, the wing 9 is moved inwardly or outwardly as desired.

The wings 9 themselves are constructed as shown in Fig. 8 of a pair of rods 23 and an angular member 24, joined together at intervals by members 25, and a casing 26 fashioned thereabout so as to present a smooth wing-like surface.

Such of the wings as it is desired to operate on the jack-knife principle are provided with a pivot point 29 at one corner thereof and are attached as at 30 to a cable 31 leading to any suitable source of power. They are also provided with a series of rollers 32 fashioned around a somewhat semi-circular trackway 33 so that when power is applied to the cable 31, the wing will be swung inwardly or outwardly as is desired on the jack-knife principle.

The wings 10 on the top of the body 2 are likewise so constructed that they may be housed in the body when the craft has attained its desired altitude so as to eliminate their resistance to the air when the craft is in flight. They are mounted on standards 34 which standards are pivoted as at 35 and connected at their lower ends as at 37 to a rod 36. Movement of the rod 36 in a longitudinal direction will cause the raising or lowering of the wings 10 as is shown by the dotted lines in Fig. 11.

While I have here described the wings 10 as being movable in the above manner, I wish it understood that they may be moved in a vertical direction straight into or above the body 2 or in any of a number of other different manners, as desired.

I have also provided a series of wings 38 directly below the sides 5 and 6 and so positioned that the ends present a helical or curved appearance longitudinally of the craft. These wings 38 are adapted to upward and downward movement when the craft is in flight in such a manner that their relation to each other will remain substantially the same. In other words, when the wing on the forward end of the craft is up, the wing to the rearward end thereof will be down, and vice versa. In order to accomplish this purpose, I have provided a shaft 39 journalled as at 40 and 41 and connected at one end thereof by means of a gear 42 to a worm 43 provided on the shaft 44. The shaft 44 may be journalled as at 45 and 46 and is provided on its upper end with a gear 47 meshing with the gear 48 on the end of a shaft 49 leading to an air propeller 50. I wish it understood, however, that the shaft 39 may be propelled by an electric or gas motor equally as well as by air.

The shaft 49 is provided with offsets in all respects similar to the crank shaft of an internal combustion engine and is connected through a connecting rod 51 as at 52 with the end 53 of the wing 38. The wing 38 is pivoted as at 54 so that when the shaft 44 and the shaft 39 are rotated upward and downward movement of the wings 38 will be had through the connecting rod 51.

As heretofore explained the wings 38 are so timed on the shaft 39 as to operate alternately and maintain a helical or curved appearance longitudinally of the craft.

While I have herein shown the wings 38 as being operated from a single shaft 39, I wish it understood that any other means of operating the wings 38 either collectively or separately are within the scope of my invention.

It should be noted that the bottoms of the sides 5 and 6 are indented at the places directly above each of the wings 38 so that when the wings have attained the height of their upward movement, they are in effect housed within the sides 5 and 6 and present no resistance to the air currents all as is more particularly shown in Fig. 4.

It will also be noted that I have provided a series of openings or funnels 60 through the sides 5 and 6 so as to create a certain pressure area around the wings 38 by reason of the air currents which pass along the top of the sides 5 and 6 passing therethrough from the tops of the funnels 60 and out through the flared bottoms thereof against the wings 38.

For the propulsion of my improved craft, a number of motors may be provided within the body 2 and the sides 5 and 6 at the points behind the propellers 61 in the front thereof and the propellers 62 in the rear thereof. In this manner the motors are all encased within sections of the body 2 similar to the sections 63 and 64 as shown in Fig. 4 and may be worked upon by mechanics without necessitating the exposure of the mechanics while doing such work to the elements.

The ordinary and well known form of steering device as shown at 70 in Fig. 1 may be used.

It will be noted also that the fuselage 1 may be sectioned off to provide cabins 65 for passengers.

The body 2 and the sides 5 and 6 thereof are divided into sections such as 69 as made by the reinforcements 66, 67 and 68 so as to provide the utmost strength and stability therefor, which sections may be utilized for the purpose of gasoline storage and for passenger cabins.

It will thus be seen that I have provided an aircraft having novel means for securing the greatest possible lift in order to attain a desired flying altitude and wherein once the desired flying altitude is reached, the least possible resistance to air forces is presented as well as novel means for assisting in the propulsion of the craft. It will also be seen that I have provided a craft wherein direction of air currents is positively controlled in such a manner as to render impossible excessive tilting of the craft or the falling thereof. It will also be seen that I have provided a craft wherein a large number of passengers may be carried and the entire space within the same may be utilized for carrying purposes.

It will be seen further that the body 2 proper does not project over the forward end of the fuselage but that the sides 5 and 6 thereof extend forwardly thereof in two separate portions. This construction permits the pilot to have an unobstructed upward view from the fuselage and also adds to the stability of the craft.

It is obvious that various changes may be made in the construction and operating mechanisms of my improved craft without departing from the spirit of my invention and it is my intention to cover by my claims such changes as may be reasonably included within the scope thereof.

What I claim is:

1. An aircraft comprising a load confining body portion, the bottom of said body constituting an air supported surface and being provided with longitudinally extending air channels or troughs, propelling means for said craft, a hull secured directly to the bottom of the body portion, the latter extending laterally beyond the hull sides, and having its outer longitudinal edges terminating in a downwardly and inwardly extended portion in the nature of a V shaped outrigger keel.

2. An aircraft comprising a load confining body portion, the bottom of said body constituting an air supported surface and being provided with longitudinally extending air channels and troughs, propelling means for said craft, a hull secured directly to the bottom of the body portion, and being provided also with longitudinally extending air channels or troughs, said body portion extending laterally beyond the hull sides and having its outer longitudinal edges terminating in a downwardly and inwardly extended portion in the nature of a V shaped outrigger keel.

3. An aircraft comprising a load confining body portion of greater length than width, the bottom of said body portion being concave and forming an air supported surface, propelling means for said craft, a hull secured directly to the bottom of the body portion, the latter extending laterally beyond the hull sides and having its outer longitudinal edges terminating in a downwardly and inwardly extended portion in the nature of a V shaped outrigger keel.

4. An aircraft comprising a load confining body portion whose geometrical figure is an obovate oblong the bottom thereof forming an air supported surface, propelling means for said craft, a hull secured directly to the bottom of the body portion, the latter extending laterally beyond the hull sides and having its outer longitudinal edges terminating in a downwardly and inwardly extended portion in the nature of a V shaped outrigger keel.

5. An aircraft comprising a load confining body portion of greater length than width, the bottom of said body portion being concave and forming an air supported surface, propelling means for said craft, a hull secured directly to the bottom of the body portion, the latter extending laterally beyond the hull sides, and wings extending laterally of said body portion adapted to assist said craft in attaining altitude and means for moving said wings into said body portion and out of contact with the air forces when said altitude is reached.

6. An aircraft comprising a load confining body portion, the bottom of said body constituting an air supported surface and being provided with longitudinally extending air channels or troughs, propelling means for said craft, a hull secured directly to the bottom of the body portion, the latter extending laterally beyond the hull sides, and wings extending laterally of said body portion adapted to assist said craft in attaining altitude and means for moving said wings into said body portion and out of contact with the air forces when said altitude is reached.

7. An aircraft comprising a load confining body portion of greater length than width, the bottom of said body portion being concave and forming an air supported surface, propelling means for said craft, a hull secured directly to the bottom of the body portion, the latter extending laterally beyond the hull sides, wings of varying heights extended above said body portion and being spaced apart longitudinally thereof adapted to assist said craft in attaining altitude, and means for disposing said wings upon said body portion and out of operating contact with the air forces when said altitude is reached.

8. An aircraft comprising a load confining body portion, the bottom of said body constituting an air supported surface and being provided with longitudinally extending air channels or troughs, propelling means for said craft, a hull secured directly to the bottom of the body portion, the latter extending laterally beyond the hull sides, wings of varying heights extended above said body portion and being spaced apart longitudinally thereof adapted to assist said craft in attaining altitude, and means for disposing said wings upon said body portion and out of operating contact with the air forces when said altitude is reached.

9. An aircraft comprising a load confining body portion of greater length than width, the bottom of said body portion being concave and forming an air supported surface, propelling means for said craft, a hull secured directly to the bottom of the body portion, the latter extending laterally beyond the hull sides, and wings extending laterally of said body portion adapted to assist said craft in attaining altitude and means for moving said wings jack knife fashion into said body portion and out of contact with the air forces when said altitude is reached.

10. An aircraft comprising a load confining body portion of greater length than width, the bottom of said body portion being concave and forming an air supported surface, propelling means for said craft, a hull secured directly to the bottom of the body portion, the latter extending laterally beyond the hull sides, said wings extending laterally of said body portion adapted to assist said craft in attaining altitude and means for moving said wings transversely into said body portion and out of contact with the air forces when said altitude is reached.

11. An aircraft comprising a load confining body portion of greater length than width, the bottom of said body portion being concave and forming an air supported surface, propelling means for said craft, a hull secured directly to the bottom of the body portion, the latter extending laterally beyond the hull sides; said hull and said body portion being open each to the other so as to provide a continuous habitable body the latter having its outer longitudinal edges terminatng in a downwardly and inwardly extended portion in the nature of a V shaped outrigger keel.

12. An aircraft comprising a load confining body portion of greater length than width, the bottom of said body portion being concave and forming an air supported surface, propelling means for said craft, a hull secured directly to the bottom of the body portion, the latter extending laterally beyond the hull sides; said body portion being indented or cut into at the front at approximately its center by a somewhat U shaped recess.

13. An aircraft comprising a body portion of greater length than width, the under side of said body portion forming an air supported surface and being provided with transversely concaved portion and the outer longitudinal edges thereof being turned downwardly and inwardly in the nature of an outrigger keel.

14. An aircraft comprising a load confining body portion having a hull secured directly to the bottom thereof, said body constituting an air supported surface, means for propelling the craft and wings adapted to be alternately housed in said body portion and moved outwardly therefrom into contact with the air.

RICHARD A. DAVENPORT.